United States Patent
Messing et al.

(10) Patent No.: US 11,459,999 B2
(45) Date of Patent: Oct. 4, 2022

(54) ROTOR BLADE, WIND TURBINE, AND METHOD FOR OPTIMIZING A WIND TURBINE

(71) Applicant: Wobben Properties GmbH, Aurich (DE)

(72) Inventors: Ralf Messing, Aurich (DE); Jan Carsten Ziems, Aurich (DE); Florian Rubner, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/271,975

(22) PCT Filed: Aug. 27, 2019

(86) PCT No.: PCT/EP2019/072837
§ 371 (c)(1),
(2) Date: Feb. 26, 2021

(87) PCT Pub. No.: WO2020/043722
PCT Pub. Date: Mar. 5, 2020

(65) Prior Publication Data
US 2021/0340946 A1 Nov. 4, 2021

(30) Foreign Application Priority Data
Aug. 30, 2018 (DE) .................. 10 2018 121 190.2

(51) Int. Cl.
*F03D 1/06* (2006.01)
(52) U.S. Cl.
CPC .... *F03D 1/0633* (2013.01); *F05B 2240/2211* (2013.01); *F05B 2240/302* (2013.01); *F05B 2240/3062* (2020.08)

(58) Field of Classification Search
CPC .... F03D 1/0633; F03D 1/0675; F03D 1/0641; F03D 1/0683; F05B 2240/302; F05B 2240/3062
See application file for complete search history.

(56) References Cited

U.S. PATENT DOCUMENTS 8,746,053 B2 * 6/2014 Brake .................. F03D 1/0608
  73/147
10,400,744 B2 * 9/2019 Herrig .................. F03D 1/0641
(Continued)

FOREIGN PATENT DOCUMENTS

DE   102012107415 A1   2/2013
EP       1944505 A1   7/2008
(Continued)

OTHER PUBLICATIONS

Gyatt, "Development and Testing of Vortex Generators for Small Horizontal Axis Wind Turbines", Final Report DOE/NASA/0367-1, Jul. 1986, 45 pages.
(Continued)

*Primary Examiner* — Courtney D Heinle
*Assistant Examiner* — Sang K Kim
(74) *Attorney, Agent, or Firm* — Seed IP Law Group LLP

(57) ABSTRACT

A rotor blade of a rotor of a wind turbine, and to an associated wind turbine, and to a method for optimizing a wind turbine. Prior to being mounted on the wind turbine, the rotor blade is split at a parting point into an inner blade section and an outer blade section, wherein a longitudinal direction of the rotor blade is defined from the root section to the blade tip, wherein the rotor blade has at least one swirl element, wherein the swirl element has an extent in the longitudinal direction of the rotor blade, wherein a distance between a start, facing toward the root section, and an end, facing toward the rotor blade tip, of the swirl element in the longitudinal direction is referred to as total length, and
(Continued)

wherein a distance between the parting point and the outer end of the swirl element is referred to as outer length, wherein a ratio of outer length to total length is less than 0.25.

15 Claims, 3 Drawing Sheets

(56) References Cited

U.S. PATENT DOCUMENTS

| | | | | |
|---|---|---|---|---|
| 10,458,388 | B2* | 10/2019 | Fukami | F03D 1/0675 |
| 2012/0141287 | A1 | 6/2012 | Hynum et al. | |
| 2014/0328688 | A1* | 11/2014 | Wilson | F01D 5/02 416/223 R |
| 2016/0047357 | A1 | 2/2016 | Erbslöh et al. | |
| 2017/0314530 | A1* | 11/2017 | Herrig | F03D 1/0641 |
| 2018/0038341 | A1* | 2/2018 | Fukami | F03D 1/0675 |
| 2018/0038343 | A1 | 2/2018 | Vossler et al. | |
| 2019/0010917 | A1* | 1/2019 | Harada | F03D 1/0675 |
| 2019/0285046 | A1* | 9/2019 | Doosttalab | F03D 1/0683 |

FOREIGN PATENT DOCUMENTS

| | | | |
|---|---|---|---|
| EP | 2634418 | A2 | 9/2013 |
| EP | 2657513 | A2 | 10/2013 |
| EP | 2799710 | A1 | 11/2014 |
| EP | 3115598 | A1 * | 1/2017 ............. F03D 7/022 |

OTHER PUBLICATIONS

ENERCON GmbH, ENERCON Produktübersicht, 2017, https://www.enercon.de/fileadmin/Redakteur/Medien-Portal/broschueren/pdf/ENERCON_Produkt_de_042017.pdf, 21 pages (with English machine translation: "The right wind turbine for every location ENERCON product overview", 40 pages total.

* cited by examiner

ROTOR BLADE, WIND TURBINE, AND METHOD FOR OPTIMIZING A WIND TURBINE

BACKGROUND

Technical Field

The present invention relates to a rotor blade for a rotor of a wind turbine, to an associated rotor, to an associated wind turbine, and to an associated wind farm. The present invention also relates to a corresponding method for optimizing a wind turbine. The invention relates in particular to two-part rotor blades, that is to say rotor blades which have at least one parting point along a rotor blade longitudinal axis.

Description of the Related Art

Rotor blades for wind turbines are known. Rotor blades mounted on a rotor of the wind turbine have an aerodynamic profile which, by way of the prevailing wind, generates an aerodynamic force which is ultimately converted for generating electrical power of the wind turbine. It has always been an object to maximize the yield of rotor blades of wind turbines.

The aim of maximizing the yield of rotor blades has led to ever-larger rotor blades, with the result that it is now no longer rare for rotors to have a diameter well in excess of 100 m (meters). While a relatively large length of the rotor blade offers advantages in terms of yield, ever-growing challenges in the areas of production and transport are being presented.

One possibility, specifically as a response to the transport problems, is to split the rotor blades in the longitudinal direction. A so-called split or two-part rotor blade has an outer blade, with a blade tip, and an inner blade, which are connected at a parting point. The inner blade thus runs from the rotor hub to the parting point, at which the outer blade follows as far as the blade tip. Naturally, it is also possible for the outer blade to be further split into multiple blade parts. All forms of rotor blades having at least one parting point will be referred to below by the expression "split rotor blade".

It is however also known that the provision of the parting point presents a challenge in terms of aerodynamics and, especially owing to the associated weight, in terms of structure.

At the same time, there also increases with increasing rotor blade length the likelihood of flow separation in a rotor blade region close to the hub, that is to say in the vicinity of the center of the rotor surface. There, use has to be made of profiles with a large relative thickness, which, especially in the case of a fouled rotor blade surface, tend to cause the flow to separate. In this regard, it is known to arrange on the rotor blade in the regions close to the hub swirl elements, for example vortex generators, which are designed to introduce energy into the flow boundary layer and accordingly to delay separation of the flow. The swirl elements unavoidably generate an increased drag, and so the use of the swirl elements needs to be weighted against the associated disadvantages.

The German Patent and Trademark Office has searched the following prior art in the priority application relating to the present application: DE 10 2012 107 415 A1, US 2018/0038343 A1, EP 1 944 505 A1, EP 2 634 418 A2, EP 2 657 513 A2, EP 2 799 710 A1.

BRIEF SUMMARY

Provided is a rotor blade for wind turbines that has at least two parts and that makes improved yield possible.

According to a first aspect, provided is a rotor blade of a rotor of a wind turbine, wherein, prior to being mounted on the wind turbine, the rotor blade is split at a parting point into an inner blade section and an outer blade section, wherein the inner blade section extends from a root section for mounting the rotor blade on a rotor hub of the wind turbine to the parting point, and the outer blade section follows from the parting point as far as a rotor blade tip. A longitudinal direction of the rotor blade is defined from the root section to the blade tip. The rotor blade has at least one swirl element. The swirl element has an extent in the longitudinal direction of the rotor blade. A distance between a start, facing toward the root section, and an end, facing toward the rotor blade tip, of the swirl element in the longitudinal direction is referred to as total length. A distance between the parting point and the outer end of the swirl element is referred to as outer length. A ratio of outer length to total length is less than 0.25, preferably less than 0.2, and particularly preferably less than 0.15.

The present disclosure is based on the realization that there is an important relationship between the position of the parting point and the extent of the swirl elements into an outer region of the blade. In particular, it has been found that the outer length, that is to say the length by which the swirl element extends beyond the parting point in the direction of the blade tip, relative to the total length of the swirl element, is not to exceed a particular ratio in order for the drag generated by said swirl element to be kept within limits.

The particular relevance of the parting point arises through the fact that the rotor blade profile has a particular design owing to the parting point. In this regard, provision is specifically to be made in particular of a profile which is thicker, that is to say a profile with a greater relative thickness, that is to say ratio of profile thickness to profile length, than in an unsplit blade, since, for a less thick profile, the loads acting at the parting point are too large. There is thus interplay between the position of the parting point and the relative thickness of the blade, which in turn exhibits interplay with the spread and effectiveness of the swirl elements. It is also possible to provide an alternative parting point at thinner profiles, in particular in a region of the rotor blade that is far to the outside. In this case, it analogously applies that, as a result of the parting point, a particular adaptation of the design of the rotor blade profile is provided.

The swirl element need not be of a continuous form and may also, for example and preferably, have interruptions in the radial direction. In particular, the swirl element may also be formed from multiple sub-elements. In this case, the start and the end of the swirl element are always based on the absolute start and the absolute end, respectively, of all the parts of the swirl element, that is to say, even in the case in which the swirl element is of multi-part design or designed with interruptions, nothing is changed.

The value defined according to the claims of the ratio of at most 0.25, preferably at most 0.2, and particularly preferably at most 0.15, for outer length to total length of the swirl element takes into account this realization of the interplay of parting point position and position and spread of the swirl elements and has proven to be reliable as an upper limit value. It should be noted that the outer length may also have a negative value, specifically if the swirl element does not in fact even extend outwardly as far as the parting point in the rotor blade longitudinal direction, but already ends before said parting point.

Wind turbines with two-part blades used hitherto, for example Enercon E-126 EP4 or E-141 EP4, likewise have swirl elements. In the case of these known wind turbines, the swirl elements have hitherto been spread as far as a point situated further to the outside in the vicinity of the blade tip, with the result that the ratio of outer length to total length has a larger value. However, it has been found that the rotor blades can be improved according to the invention through modification of the swirl elements and adherence to the value of the ratio.

In one embodiment, the swirl element has one or more vortex generators. The vortex generators are arranged in particular on a suction side of the rotor blade.

It is known that profiles of rotor blades extend from a leading edge to a trailing edge, which are connected with a so-called pressure side and the suction side. Separation-free flow around the suction side is particularly important for attaining the profile lift and drag values according to design.

In one embodiment, the vortex generators are formed as fins which are arranged in pairs and which are arranged so as to be substantially perpendicular to the suction side. The pairwise arrangement makes it possible for counter-rotating vortices to be introduced into the boundary layer. The formation as fins, for example with a triangular form, is a particularly simple configuration of vortex generators, wherein other expedient forms are of course also known to a person skilled in the art. Here, substantially perpendicular to the suction side is to be understood as meaning an angle between rotor blade surface and fin that is greater than 45°, preferably greater than 60°, and particularly preferably at least 80°.

Particularly preferably, the swirl element comprises a plastic material, in particular short fiber-reinforced plastic material, or consists thereof.

In one embodiment, the vortex generators have a geometry as a function of position in the longitudinal direction of the rotor blade. It is accordingly preferable for provision to be made of different geometries of the vortex generators according to position in the rotor blade longitudinal direction. In this regard, it is possible for example for a height, that is to say an extent perpendicular to the rotor blade surface, or a length, that is to say an extent in the plane of the rotor blade surface, to be ever larger, the closer the vortex generator is to the root section. Alternatively or additionally, it is also possible for a distance between two adjacent vortex generators and/or an angle between the main incident-flow direction, in particular perpendicular to the leading edge of the rotor blade, and a direction of the vortex generator to be varied with position in the longitudinal direction.

In one embodiment, the start of the swirl element is adjacent to the root section. Accordingly, the swirl element extends as far as a region in the vicinity of the rotor blade root. In said region, the velocity component due to the rotor rotation is at its lowest. Alternatively, the start of the swirl element is spaced apart from the root section by a specific length. This can be advantageous in particular for a case of cylindrical profiles in the vicinity of the rotor blade root. Particularly preferably, the start of the swirl element is situated on a section of the rotor blade that has an aerodynamic profile. An aerodynamic profile is to be understood as meaning a profile which is capable of generating lift.

In one embodiment, the outer length acquires a negative sign if the end of the swirl element, in the longitudinal direction, is situated closer to the root section than the parting point. The ratio of outer length to total length is preferably negative. In other words, in this preferred embodiment, the swirl element extends only within the inner region of the blade. This may be realized in that the parting point is moved far to the outside, and/or else the swirl element is correspondingly dimensioned and arranged.

In one embodiment, the outer blade section has a further parting point. The rotor blade is thus not restricted to two-part splitting, the first parting point as viewed from the blade tip being at any rate the parting point relevant for the determination of the lengths of the swirl element.

According to a second aspect, provided is a rotor having at least one rotor blade according to the first aspect. A diameter of the rotor is at least 170 m. The advantages of the arrangement and design according to the invention of the swirl element are realized particularly for rotors with a correspondingly large design.

According to a third aspect, provided is a wind turbine having a rotor according to the invention according to the second aspect.

According to a fourth aspect, provided is a wind farm having multiple wind turbines according to the third aspect.

According to a fifth aspect, provided is a method for optimizing a wind turbine. The wind turbine has an aerodynamic rotor having at least one rotor blade, wherein the rotor blade is split at a parting point into an inner blade section and an outer blade section, wherein the inner blade section extends from a root section for mounting the rotor blade on a rotor hub of the wind turbine to the parting point, and the outer blade section follows from the parting point as far as a rotor blade tip, wherein a longitudinal direction of the rotor blade is defined from the root section to the blade tip. The method comprises the following steps: providing and mounting at least one swirl element which has an extent in the longitudinal direction of the rotor blade, wherein a distance between a start, facing toward the root section, and an end, facing toward the rotor blade tip, of the swirl element in the longitudinal direction is referred to as total length, and wherein a distance between the parting point and the outer end of the swirl element is referred to as outer length, wherein the swirl element is provided and mounted in such a way that a ratio of outer length to total length is less than 0.25, preferably less than 0.2, and particularly preferably less than 0.15.

The method according to the invention allows achievement of the same advantages as the rotor blade according to the invention and can be combined with the embodiments described for the rotor blade in the same way.

BRIEF DESCRIPTION OF THE SEVERAL
VIEWS OF THE DRAWINGS

Further advantages and configurations will be described below with reference to the appended drawings. In the drawings.

The explanation of the invention on the basis of examples with reference to the figures is substantially schematic, and, for the sake of better illustration, the elements which are explained in the respective figure may be exaggerated in it and other elements may be simplified. In this regard, for example, FIG. 1 schematically illustrates a wind turbine as such, such that a provided arrangement of swirl elements cannot be clearly seen.

DETAILED DESCRIPTION

Figure 1:
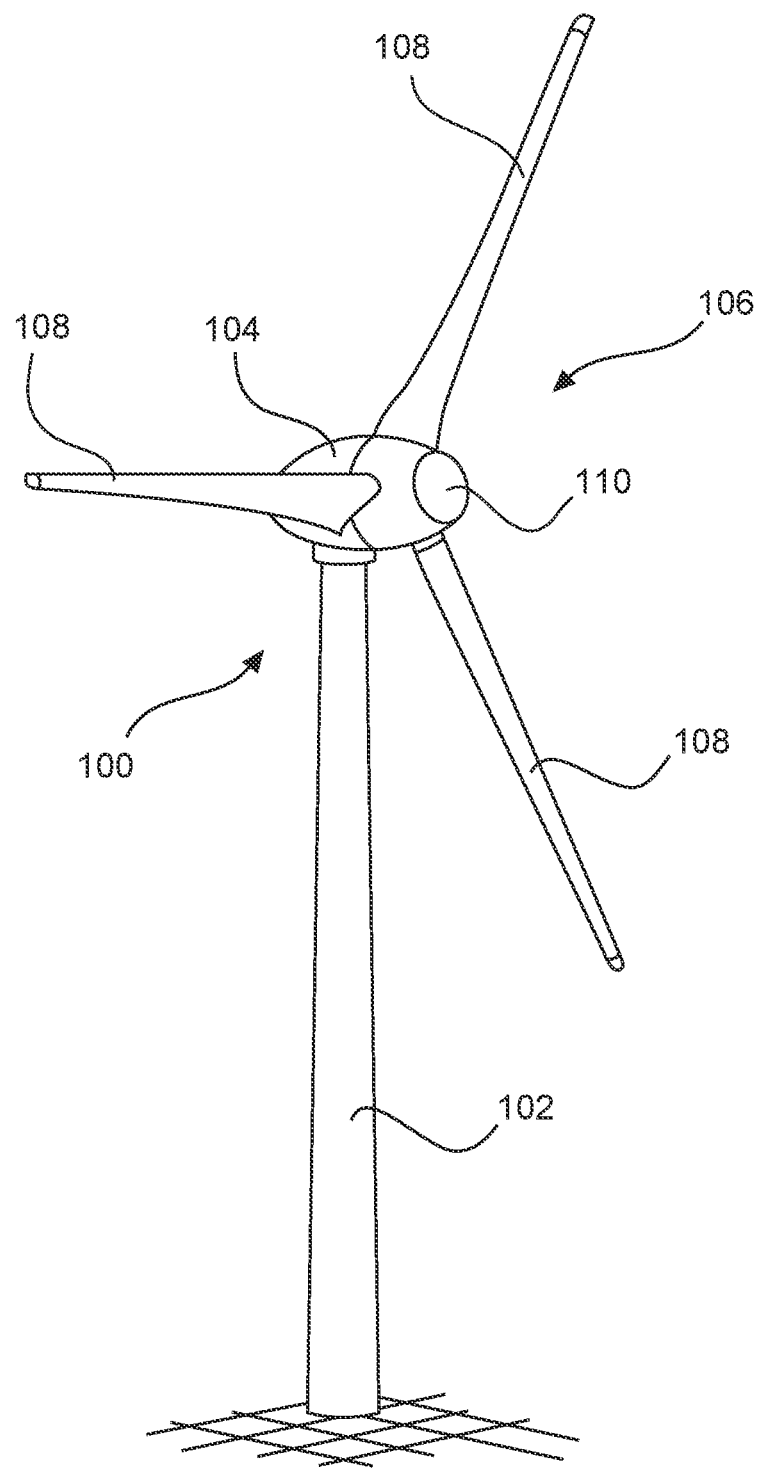
FIG. 1 shows schematically and by way of example a wind turbine.

FIG. 1 shows a wind turbine 100 having a tower 102 and having a nacelle 104. A rotor 106 having three rotor blades 108 and having a spinner 110 is arranged on the nacelle 104. During operation, the rotor 106 is set in rotational motion by the wind and in this way drives a generator in the nacelle 104. The rotor blades 108 are settable in terms of their blade angle.

Figure 2:
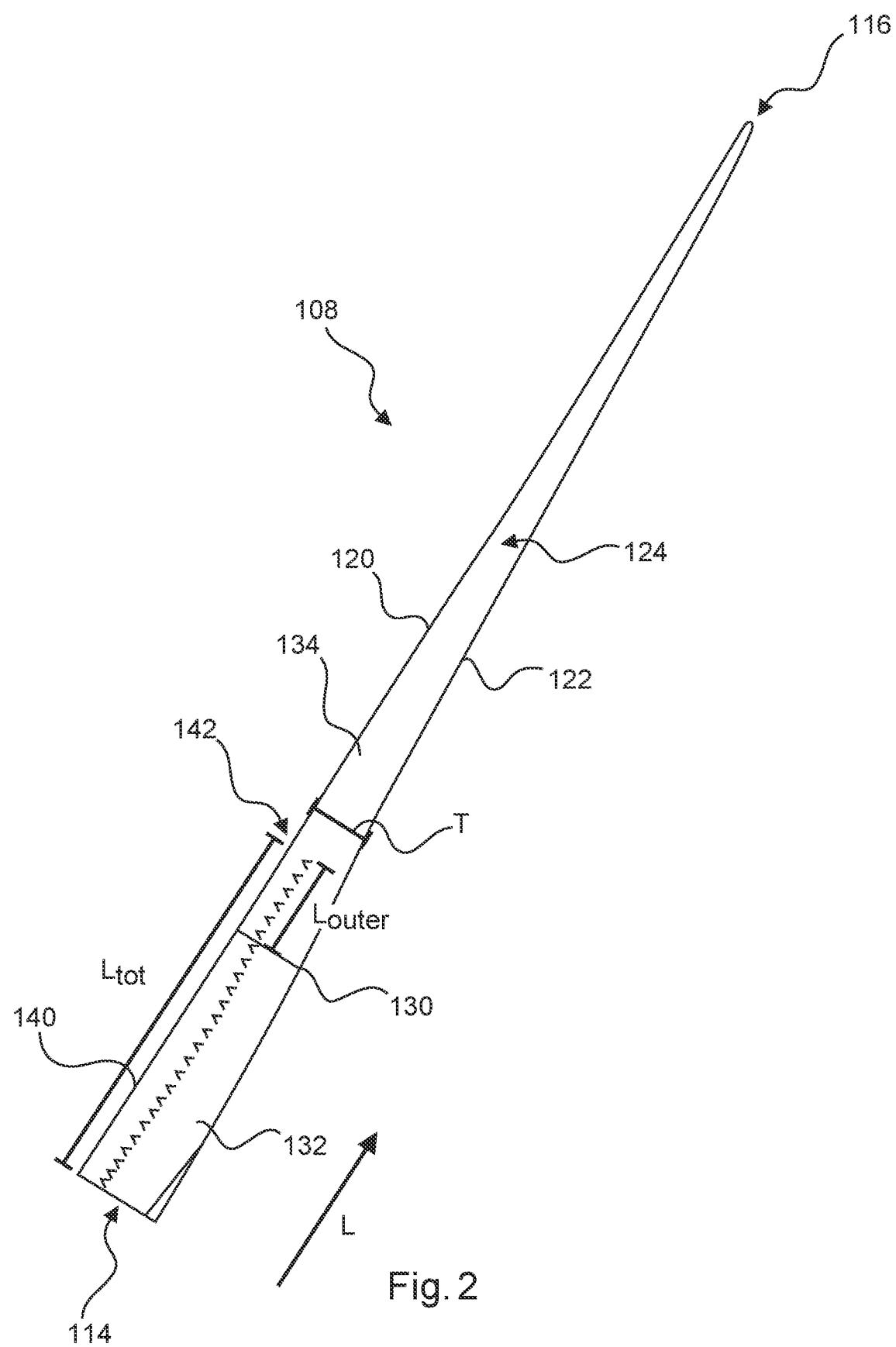
FIG. 2 shows schematically and by way of example a rotor blade of a wind turbine.

FIG. 2 shows a schematic view of an individual rotor blade 108 with a rotor blade leading edge 120 and a rotor blade trailing edge 122. A plan view of a suction side 124 of the rotor blade is shown, the opposite pressure side not being visible in the view.

The rotor blade 108 has a rotor blade root 114 and a rotor blade tip 116. The length between the rotor blade tip 114 and the rotor blade root 116 is referred to as the rotor blade length R along a longitudinal direction L. The distance between the rotor blade leading edge 120 and the rotor blade trailing edge 122 is referred to as the profile depth T. At the rotor blade root 114, or in general in the region close to the rotor blade root 114, the rotor blade 108 has a large profile depth T. At the rotor tip 116, the profile depth T is, by contrast, very much smaller.

A parting point 130 is provided approximately in a middle region in the longitudinal direction L of the rotor blade 108. The parting point splits the rotor blade into two sections, an inner blade section 132 and an outer blade section 134. The inner blade section 132 extends from the region of the rotor blade root 114 as far as the parting point 130, and the outer blade region 134 adjoins the parting point 130 and extends as far as the rotor blade tip 116. Naturally, it is also conceivable for there to be more than one parting point 130, such as parting point 130' in FIG. 3, wherein then the outer blade region 134 is split into multiple parts. The rotor blade 108 is joined together at the blade parting point 130 prior to or during mounting at the erection site.

A swirl element 140 is furthermore arranged in the schematic plan view shown in FIG. 2 of the suction side 124. In other embodiments, the swirl element 140 may also be arranged for example on the pressure side. The swirl element 140 delays flow separation in the region in which the swirl element 140 is arranged through additional input of energy into the boundary layer. Various types of swirl elements 140 are known, including active and passive swirl elements.

Figure 3:
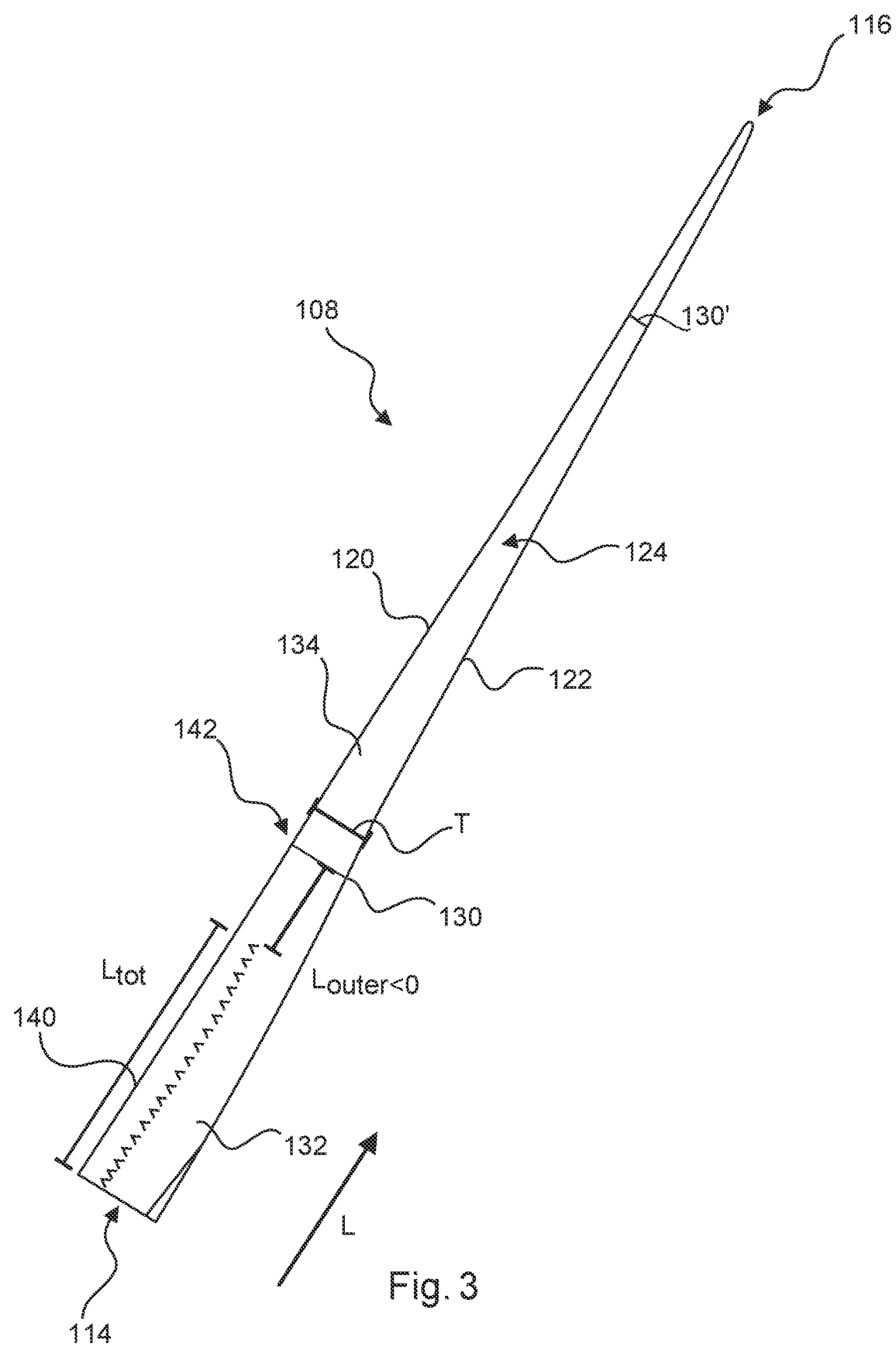
FIG. 3 shows schematically and by way of another example a rotor blade of a wind turbine.

The discovery of the interplay of parting point 130 and extent of the swirl element 140 in the longitudinal direction L of the rotor blade 108 is useful. A total extent $L_{tot}$ refers to the extent of the swirl element 140 from the rotor blade root 114 as far as a radially outer end 142 in the longitudinal direction L. An outer length $L_{outer}$ of the swirl element 140 refers to the length in the longitudinal direction L from the blade parting point 130 as far as the radially outer end 142 of the swirl element 140. For the case in which the parting point 130 is situated further to the outside than the end 142 of the swirl element 140 as shown in FIG. 3, the value of $L_{outer}$ will acquire a negative sign.

For the assessment as to whether the arrangement of the swirl element 140 is advantageous or not, a ratio of the outer length or outside length $L_{outer}$ to the total length $L_{tot}$ is formed. The ratio is considered to be advantageous as soon as it reaches a value of at most 0.25. In other words, the blade parting point 130 has to be relatively far to the outside in relation to the total length of the swirl element 140.

Here, the parting point 130 may also be situated further to the outside than the end 142 of the swirl element 140, it however being disadvantageous if the swirl element 140 extends to the outside such that the ratio of $L_{outer}$ to $L_{tot}$ is greater than 0.25.

One realization of the present invention is that swirl elements extending further to the outside generate drag to an excessive extent, while no longer bringing about the flow separation-delaying effect to the extent that an overall consideration which is efficiency-increasing as a result follows.

For the ratio, the particular geometry and aerodynamics of the parting point 130 that are to be considered in the case of two-part rotor blades 108 are particularly relevant. In this regard, the particular realization of the present invention is the necessity of setting the extent of the swirl element 140 in relation to the position of the parting point 130. Preferably, the wind turbine has a rotor diameter D of at least 170 m, since it is the case particularly for large rotors that the advantages of the swirl element 140 and of the multiple splitting of the rotor blades 108 are fully realized.

The invention claimed is:

1. A rotor blade of a rotor of a wind turbine, comprising:
an inner blade section,
an outer blade section,
a parting point, and
at least one swirl element,
wherein, prior to being mounted on the wind turbine, the rotor blade is split apart at the parting point into the inner blade section and the outer blade section, wherein the inner blade section extends from a root section for mounting the rotor blade on the rotor of the wind turbine to the parting point, and the outer blade section extends from the parting point to a rotor blade tip,
wherein a longitudinal direction of the rotor blade is defined from the root section to the blade tip,
wherein the swirl element extends in the longitudinal direction of the rotor blade,
wherein a distance between a start, facing toward the root section, and an end, facing toward the rotor blade tip, of the swirl element in the longitudinal direction is referred to as a total length,
wherein a distance between the parting point and the end of the swirl element is referred to as an outer length, and
wherein a ratio of the outer length to the total length is less than 0.25.

2. The rotor blade as claimed in claim 1, wherein the swirl element has one or more vortex generators arranged on a suction side of the rotor blade.

3. The rotor blade as claimed in claim 2, wherein the one or more vortex generators are formed as fins arranged in pairs and are perpendicular to the suction side.

4. The rotor blade as claimed in claim 3, wherein the one or more vortex generators have a geometry as a function of position in the longitudinal direction of the rotor blade.

5. The rotor blade as claimed in claim 1, wherein the start of the swirl element is adjacent to the root section.

6. The rotor blade as claimed in claim 1, wherein the outer length is negative if the end of the swirl element, in the longitudinal direction, is situated closer to the root section than the parting point such that the ratio of the outer length to the total length is negative.

7. The rotor blade as claimed in claim 1, wherein parting point is a first parting point, wherein the outer blade section has a second parting point.

8. A rotor having at least one rotor blade as claimed in claim 1, wherein a diameter of the rotor is at least 170 meters.

9. A wind turbine having the rotor as claimed in claim 8.

10. A wind farm having a plurality of wind turbines as claimed in claim 9.

11. The rotor blade as claimed in claim 1, wherein the ratio of the outer length to the total length is less than 0.2.

12. The rotor blade as claimed in claim 1, wherein the ratio of the outer length to the total length is less than 0.15.

13. A method for optimizing a wind turbine, wherein the wind turbine has an aerodynamic rotor having at least one rotor blade, wherein the rotor blade is split at a parting point into an inner blade section and an outer blade section, wherein the inner blade section extends from a root section for mounting the rotor blade on a rotor hub of the wind turbine to the parting point, and the outer blade section extends from the parting point to a rotor blade tip, wherein a longitudinal direction of the rotor blade is defined from the root section to the rotor blade tip, and wherein the method comprises:

mounting at least one swirl element to the rotor blade, wherein the mounting comprises mounting the at least one swirl element so that the at least one swirl element extends in the longitudinal direction of the rotor blade, wherein a distance between a start, facing toward the root section, and an end, facing toward the rotor blade tip, of the at least one swirl element in the longitudinal direction is referred to as a total length, and wherein a distance between the parting point and the outer end of the at least one swirl element is referred to as an outer length, and wherein the at least one swirl element is provided and mounted in such a way that a ratio of the outer length to the total length is less than 0.25.

14. The method as claimed in claim 13, wherein the ratio of outer length to total length is less than 0.2.

15. The method as claimed in claim 13, wherein the ratio of the outer length to the total length is less than 0.15.

* * * * *